United States Patent [19]

Lee et al.

[11] Patent Number: 4,929,585
[45] Date of Patent: May 29, 1990

[54] MIXED-SOLID SOLUTION TRI-METALLIC OXIDE/SULFIDE CATALYST AND PROCESS FOR ITS PREPARATION

[75] Inventors: Anthony L. Lee, Glen Ellyn; Howard S. Meyer, Hoffman Estates; Vern L. Hill, Niles, all of Ill.

[73] Assignee: Gas Research Institute, Chicago, Ill.

[21] Appl. No.: 364,701

[22] Filed: Jun. 9, 1989

[51] Int. Cl.$^5$ ............... B01J 21/06; B01J 23/02; B01J 23/28; B01J 27/051

[52] U.S. Cl. .................... 502/220; 502/216; 502/219; 502/302; 502/303; 502/306; 502/307; 502/308; 502/309; 502/340; 502/343; 502/344; 502/349

[58] Field of Search ............... 502/216, 219, 220, 302, 502/303, 306, 307, 308, 309, 340, 343, 344, 349

[56] References Cited

U.S. PATENT DOCUMENTS

| | | | |
|---|---|---|---|
| 3,116,345 | 12/1963 | Slaymaker | 260/683.15 |
| 4,151,191 | 4/1979 | Happel et al. | 260/449 M |
| 4,260,553 | 4/1981 | Happel et al. | 260/449 M |
| 4,320,030 | 3/1982 | Happel et al. | 252/432 |
| 4,491,639 | 1/1985 | Happel et al. | 502/219 |
| 4,582,630 | 4/1986 | Quang et al. | 252/373 |
| 4,594,140 | 6/1986 | Cheng | 208/414 |
| 4,595,672 | 6/1986 | Ho et al. | 502/220 X |
| 4,613,584 | 9/1986 | Schneider et al. | 502/304 |
| 4,620,940 | 11/1986 | Quang et al. | 252/373 |
| 4,624,684 | 11/1986 | Stevenson | 48/197 R |
| 4,654,164 | 3/1987 | Najjar | 252/373 |
| 4,678,480 | 7/1987 | Heinrich et al. | 48/197 R |
| 4,678,600 | 7/1987 | Stahl et al. | 252/373 |
| 4,681,701 | 7/1987 | Sie | 252/373 |
| 4,690,690 | 9/1987 | Andrew et al. | 48/214 A |
| 4,690,814 | 9/1987 | Velenyi et al. | 423/648 R |
| 4,755,496 | 7/1988 | Ho et al. | 502/220 X |

*Primary Examiner*—W. J. Shine
*Attorney, Agent, or Firm*—Thomas W. Speckman; Douglas H. Pauley

[57] ABSTRACT

A mixed-solid solution tri-metallic oxide/sulfide catalyst having the formula:

$$M_IO_aS_b \cdot M_{II}O_c M_{III}O_d$$

wherein $M_I$ is vanadium, neodymium, tantalum, chromium, molybdenum, tungsten, and mixtures thereof; O is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is titanium, zirconium, hafnium, and mixtures thereof; c is a positive real number up to the stoichiometric requirement; $M_{III}$ is lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_c \cdot M_{III}O_d$. A process for production of the above catalyst and its use in hydroforming reactions is taught.

16 Claims, No Drawings

MIXED-SOLID SOLUTION TRI-METALLIC OXIDE/SULFIDE CATALYST AND PROCESS FOR ITS PREPARATION

BACKGROUND OF THE INVENTION

1. Field of the Invention

This invention relates to mixed-solid solution tri-metallic oxide/sulfide catalysts useful for hydroforming reactions. The active metallic catalyst is in oxide or sulfide form and mixed with a solid solution substrate of at least two metallic oxides. The catalysts are stable and active under high temperature conditions and are tolerant to sulfur containing feed materials.

2. Description of the Prior Art

Specific metal oxides and metal sulfides and mixtures of metal oxides and metal sulfides are known to serve as catalysts, particularly for low temperature hydrogenation reactions. U.S. Pat. No. 3,116,345 teaches a catalyst for hydroisomerization which is a sulfide of one or more metals of chromium, molybdenum, and tungsten and/or a sulfide of one or more metals of iron, cobalt and nickel on a solid support of silica, alumina, or mixed silica-zirconia. U.S. Pat. Nos. 4,151,191 and 4,260,553 teach mixed metallic catalysts of molybdenum oxides or sulfides, lanthanide and actinide oxides or sulfides; and aluminum, tungsten and silicon oxides may be used as methanation catalysts up to about 600° C. U.S. Pat. Nos. 4,320,030 and 4,491,639 teach vanadium, molybdenum or tungsten sulfide or mixed sulfide/oxide compounds which may contain aluminum, silicon, boron, cerium or titanium; cobalt, nickel, iron or manganese; carbon; and nitrogen for use as hydrogenation catalysts. The applicants do not have knowledge of any tri-metallic oxide/sulfide catalysts wherein a first metallic oxide/sulfide is mixed with a solid solution of a second and third metallic oxide material.

Conventional technologies of conversion of liquids derived from naturally carbonaceous sources to light-medium hydrocarbons are catalytic processes of hydro-treating, hydro-cracking, and steam reforming. In steam reforming, sulfur compounds deactivate and phenolic compounds increase fouling of the catalyst. Therefore, the feedstock must be processed to remove acid gases prior to steam reforming. Feedstock having an end point higher than that of naphtha, about 365° F., cannot be commercially reformed at the present time. The requirement of high temperature, high pressures, hydrogen and steam as reactants in the conventional processes result in high costs. For example, in a conventional coal or oil conversion process, the effluent stream from the conversion reactor is conventionally quenched to about 95° to 130° F. to remove naphthas, oils, fatty acids, phenols and tars and process steam is condensed and treated before disposal. The cooled material is then fed to a hydro-treating/hydro-cracking reactor which is operated under pressurized conditions of up to 2,000 psig and heated to temperatures in the order of 700° to 800° F. and the reaction consumes large quantities of fresh hydrogen. Sulfur must be removed from the product stream of the hydro-treating/hydro-cracking vessel to a low concentration, in the order of 0.1 to 0.5 ppm, to insure that the steam reforming catalyst is not poisoned. In the following steam reformer/hydroformer, fresh steam is required and the hydrocarbon feed is limited to endpoints below 365° F.

Exemplary of recent prior art relating to conversion of naturally occurring carbonaceous materials and its hydroconversion are U.S. Pat. Nos. 4,582,630; 4,594,140; 4,613,584; 4,620,940; 4,624,684; 4,654,164; 4,678,480; 4,678,600; 4,681,701; 4,690,690; and 4,690,814.

SUMMARY OF THE INVENTION

This invention provides a mixed-solid solution tri-metallic oxide/sulfide catalyst, a process for preparation of the catalyst, and a process for hydroforming hydrocarbon liquids using the catalyst. The catalysts of this invention include an active metal oxide or metal sulfide or mixtures thereof mixed with a solid solution substrate of a second metal oxide and a third metal oxide.

The mixed-solid solution tri-metallic oxide/sulfide catalyst has the formula:

$$M_I O_a S_b \cdot M_{II} O_c M_{III} O_d$$

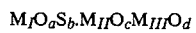

wherein $M_I$ is selected from the group consisting of vanadium, neodymium, tantalum, chromium, molybdenum, tungsten, and mixtures thereof; O is oxygen; S is sulfur; a is selected from zero and a number up to a positive real number representing the stoichiometric requirement, and b is selected from zero and a number up to a positive real number representing the stoichiometric requirement, provided one of a and b is a positive real number; $M_{II}$ is selected from the group consisting of titanium, zirconium, hafnium, and mixtures thereof; c is a positive real number up to the stoichiometric requirement; $M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_I O_a S_b$ is mixed in a solid solution of $M_{II} O_c M_{III} O_d$. By the terminology tri-metallic as used throughout this description and claims, it is meant that at least one metal from each of the groups $M_I$, $M_{II}$, and $M_{III}$ is present. There may be more than one metal from each of the groups $M_I$, $M_{II}$ and $M_{III}$ present.

DESCRIPTION OF PREFERRED EMBODIMENTS

The metallic portion of the mixed-solid solution tri-metallic oxide/sulfide having the above formula, in a preferred embodiment, $M_I$ is molybdenum, $M_{II}$ is zirconium, and $M_{III}$ is magnesium, calcium, yttrium and mixtures thereof. The solid solution of $M_{II} O_c M_{III} O_d$ is comprised of about 8 to about 56 weight percent $M_{III} O_d$, the remainder being $M_{II} O_c$, and in preferred embodiments the solid solution is comprised of about 10 to about 16 weight percent $M_{III} O_d$. The metallic oxide/sulfide portion $M_I O_a S_b$ comprises about 30 to about 75 weight percent of the total mixed-solid solution tri-metallic oxide/sulfide catalyst. In preferred embodiments the $M_I O_a S_b$ portion comprises about 45 to about 55 weight percent of the total mixed-solid solution tri-metallic oxide/sulfide catalyst.

The mixed-solid solution tri-metallic oxide/sulfide catalyst may have $M_I O_a S_b$ in pure oxide form or in sulfide form and in any mixture of oxides and sulfides. The metallic sulfide portion of the catalyst provides sulfur tolerance to the catalyst of this invention, allowing use of feedstocks containing sulfur. The solid solution portion of the catalyst, $M_{II} O_c M_{III} O_d$, must initially be in the oxide form. The solid solution of the second and third metallic oxide provides high temperature stability to the mixed-solid solution trimetallic oxide/sulfide catalyst of the present invention.

The mixed-solid solution tri-metallic oxide/sulfide catalyst of this invention may be prepared by mixing $M_IO_aS_b$ metallic oxide/sulfide powder with a powder of solid solution $M_{II}O_cM_{III}O_d$. To prepare a powder of solid solution $M_{II}O_cM_{III}O_d$, a combination of $M_{II}O_c$ and $M_{III}O_d$ is prepared by preparing a liquid solution of $M_{II}O_c$ and $M_{III}O_d$; or preparing a liquid solution of one of $M_{II}O_c$ and $M_{III}O_d$ and a colloidal suspension of the other of $M_{II}O_c$ and $M_{III}O_d$ and forming a mixture of the colloidal suspension and liquid solution; or preparing a liquid solution of $M_{II}O_c$ and impregnating the liquid solution of $M_{II}O_c$ on powdered solid $M_{III}O_d$. Preferably an aqueous solution and an aqueous colloidal suspension are used and preferably the aqueous solution is of the $M_{III}$ component initially in nitrate or chloride form. Any liquid solutions or suspensions which will retain the desired oxide form of the metal compound are satisfactory. Preferably the colloidal suspension of $M_{II}O_c$ and liquid solution of $M_{III}O_d$ is mixed to form a homogeneous mixture. The combination of $M_{II}O_c$ and $M_{III}O_d$ as formed above is dried at a sufficient temperature and for a sufficient time to expel volatile components. Prior to drying, the pH of the liquid in the combination of $M_{II}O_c$ and $M_{III}O_d$ may be adjusted to form a gel which will reduce drying requirements. In a preferred embodiment, the homogeneous mixture is dried at a temperature in excess of about 110° C. following which it is calcined at a temperature of about 700° to about 750° C. for a sufficient time, about two hours, to expel volatile portions resulting in solid solution $M_{II}O_c\text{-}M_{III}O_d$ powder. The $M_IO_aS_b$ metallic oxide/sulfide component is added to and mixed with the solid solution $M_{II}O_cM_{III}O_d$ powder to form the mixed-solid solution tri-metallic oxide/sulfide powder. The mixture is then crushed and sieved to an appropriately small mesh size of about −6 to about +40, preferably about −12 to about +20 for use as a catalyst. Conventional and well-known catalyst manufacturing techniques may be employed to produce the substantially uniform or homogeneous mixed-solid solution powder as described above. Shaping of the catalyst product may be effected according to conventional techniques of the art, particularly tableting, or pelleting or extrusion. The catalyst may be used directly on its solid solution metallic oxide support.

In preparation of the solid solution metallic oxide material according to this invention, the mixed colloid suspension and aqueous solution, as described above, may be used to precipitate $M_{II}O$ and $M_{III}O$ by addition of ammonium hydroxide to a pH of about 7 to 8 followed by drying and calcining as described above.

The addition of the $M_IO_aS_b$ component to the solid solution metallic oxide may be achieved by dry mixing the powders or by any suitable impregnation, co-precipitation, ion exchange, or vapor deposition technique as is known to the art to obtain a mixed-solid solution tri-metallic oxide/sulfide catalyst of this invention. While mixing of the $M_IO_aS_b$ component with the solid solution powder, according to one embodiment of this invention, sulfur powder may be added to increase the sulfur content of the catalyst to enhance sulfur tolerance of the catalyst in use.

The active catalyst portion of the catalyst of this invention, the $M_IO_aS_b$ portion, in mixture with the solid solution metallic oxide substrate, provides a catalyst which is stable and does not lose appreciable catalytic activity up to process temperatures in the order of 2200° C. and certainly up to 1500° C. This high temperature stabilization is provided by the $M_{II}O_cM_{III}O_d$ solid solution which does not go through phase change and provide materials which clog the reactor, as prior catalysts have done.

The catalyst of this invention is especially suited to use for hydroforming hydrocarbon liquids to light hydrocarbons ($C_{1-4}$) and medium hydrocarbons ($C_{4-10}$) in a low energy requirement process. Suitable hydrocarbon liquids useful as feedstocks in the process of this invention include raw hydrocarbon liquids derived from naturally occurring carbonaceous materials such as by treatment of coal, peat, oil shale, tar sands, rock asphalt, diatomite, gilsonite, crude oil, heavy oil, and natural gas liquids, and hydrocarbon liquids derived as industrial by-products such as from coke breeze, petroleum coke, culm/tailings from coal beneficiation, screening and washing, refuse derived fuel, residual oil, coal tar and oils, coal conversion carbonaceous by-products, naphtha, coke oven gas, and refinery gas. The process of this invention is particularly suited to up-grading liquid products of coal conversion processes. The hydroforming process, combined hydrogenation and steam reforming, according to this invention comprises contacting the hydrocarbon liquids with water and hydrogen in the presence of a mixed-solid solution tri-metallic oxide/sulfide catalyst having the formula as set forth above in a liquid/vapor/solid contactor wherein the temperature is maintained at about 675° to about 1000° C., the pressure is maintained at about 0 to about 500 psig and a space velocity of about 200 to about 8000 SCF/hr-ft$^3$ catalyst is maintained. In preferred embodiments the temperature is maintained at about 780° to about 900° C., the pressure is maintained at about 1 to about 50 psig, and the space velocity is about 3000 to about 5000 SCF/hr-ft$^3$ catalyst.

It is seen that by the process of this invention, the liquid (vapor) and gaseous products from a carbonaceous material conversion unit which operates in the order of 1200° to 1700° C. may be passed directly, or with very little quenching, to the hydroformer for catalytic conversion according to the present invention utilizing process water and hydrogen from the carbonaceous material conversion unit. When the term water is used throughout this description and in the claims, it is meant to include steam, dependent upon temperatures involved. The products of the hydroformer may be subject to any desired downstream separation and purification processes for separating liquids and for acid gas removal.

The hydroforming process of this invention may provide hot hydrogen for direct utilization in further processing without heating requirements and may accommodate the temperature of the product stream of a carbonaceous material conversion unit with reduced or no quenching requirements, as compared to currently used steam reforming processes which require extensive cooling prior to hydro-treating and heating following hydro-treating. The process of this invention passes the vapor effluent directly from the natural carbonaceous material conversion reactor to a catalytic hydroformer completely eliminating the conventional hydro-treating/hydro-cracking and the first acid gas removal step. The process steam and hydrogen may be used directly in the process of this invention without special treatment. The feed to the hydroformer may have an endpoint as high as about 1,200° F. In one embodiment of this invention, the hydroformer product may be passed to a methanator to enhance methane production prior to acid gas removal. Further, the catalyst used in the hydroformer according to this invention is not poisoned by sulfur-containing material products of the carbonaceous material conversion unit and therefore no sulfur treatment is necessary prior to the hydroforming reactions, even when naturally occurring high sulfur materials are used as a feedstock to the carbonaceous material conversion unit. The hydroformer product may be treated by conventional methods to remove excess $CO_2$ and sulfur as required.

The ability of the catalyst of this invention to function at high temperatures, in the order of the temperatures of the output of conventional naturally occurring carbonaceous material conversion units, and to tolerate sulfur, significantly reduces overall process thermal input requirements, overall process hydrogen requirements, and physical plant size with the concomitant reduction in maintenance and operation costs.

The following Examples are set forth as exemplifying specific embodiments of the invention in detail and are not intended to limit the invention in any way.

EXAMPLE 1

An aqueous solution of calcium nitrate was prepared by dissolving 46.08 grams of calcium nitrate in 100 grams of deionized water. The aqueous calcium nitrate solution was added to 600.97 grams of an aqueous colloidal suspension of zirconia (Nyacol Zr 10/20, a 20 weight percent $ZrO_2$ in nitric acid suspension, sold by PQ Corporation, P.O. Box 349, Ashland, Mass. 01721). The colloidal suspension and liquid solution were mixed by stirring, following which 5 ml. portions of ammonium hydroxide (20 grams concentrated ammonium hydroxide and 80 grams of deionized water) were added until the pH of the mixture was 8, at which time the mixture had gelled. This mixture was dried at 100° C. overnight and the resulting powder calcined at 650° C. for two hours resulting in a solid solution powder of calcium oxide and zirconium oxide. 47.35 grams of the prepared calcium oxide/zirconium oxide solid solution powder was mixed with 100 grams of powdered ammonium tetrathiomolybdate and 36.12 grams of sulfur powder in a bottle on a rolling mill for two hours. The resulting mixed-solid solution tri-metallic oxide/sulfide powder was charged into a quartz reactor which was heated to 300° C. with a flow of 100 cc/min. of nitrogen. The gas flow was then switched from nitrogen to a mixture of 1,000 ppm hydrogen sulfide in hydrogen at a rate of 100 cc/min. With the flowing mixture of hydrogen sulfide in hydrogen, the powder was heated to above 450° C. but below 530° C. for one hour following which it was cooled down to 300° C. in flowing hydrogen sulfide/hydrogen gas. The gas flow was then returned to nitrogen to cool the powder down to room temperature following which the resultant mixed-solid solution tri-metallic oxide/sulfide catalyst was pelleted to a particle size of −12 +20 mesh. The catalyst powder had the following analyses:

| Element | Mole Ratio |
| --- | --- |
| molybdenum | 1.0 |
| zirconium | 0.7 |
| calcium | 0.3 |

| Element | Mole Ratio |
| --- | --- |
| oxygen | 1.7 |
| sulfur | 2.1 |

EXAMPLE 2

Hydrocarbon liquids from a Lurgi gasifier were hydroformed using the catalyst prepared in Example I. 83.6 grams, 56.7 cc, of catalyst powder as prepared in Example 1 was packed into a ½ inch diameter stainless steel reactor. Oil feed of 0°–650° F. distillation cut of Lurgi gasifier tar oil having a density of 0.93 was fed to the reactor at the indicated rate. Deionized water was passed through an electrically heated steam generator and fed to the reactor at the indicated rate. A gas mixture having the composition in mole percent: hydrogen 53.5; $C_2H_6$ 32.1; $C_2H_4$ 4.6; $C_3H_8$ 5.1; $C_3H_6$ 4.7 was fed to the reactor at the rate of 4.7 grams/hour. The reactor was operated at atmospheric pressure and conditions shown in Table 1 for two runs:

TABLE 1

|  | Run 1 | Run 2 |
| --- | --- | --- |
| Temperature, °F. | 1498 | 1511 |
| Space Velocity, lb./Ft.$^3$-hr. | 8.7 | 21.2 |
| Oil Rate, grams/Hour | 7.9 | 19.3 |
| Water Rate, grams/Hour | 73.7 | 114.3 |
| Total Feed, grams/Hour | 86.3 | 138.3 |

The product obtained had the properties shown in Table 2:

TABLE 2

| Gas Composition, mol % | Run 1 | Run 2 |
| --- | --- | --- |
| CO | 8.6 | 7.1 |
| $CO_2$ | 13.6 | 11.3 |
| $CH_4$ | 2.1 | 4.9 |
| $H_2O$ | 2.6 | 2.6 |
| $H_2$, by difference | 73.1 | 74.1 |
| Rate (Volume), ft$^3$/hr | 2.272 | 3.070 |
| Rate (Weight), grams/hr | 30.7 | 37.3 |
| Water, grams/hr | 59.9 | 83.2 |
| Total Product, grams/hr | 86.6 | 120.5 |

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A mixed-solid solution tri-metallic oxide/sulfide catalyst having the formula:

$$M_I O_a S_b \cdot M_{II} O_c M_{II} O_d$$

wherein
$M_I$ is selected from the group consisting of vanadium, neodymium, tantalum, chromium, molybdenum, tungsten, and mixtures thereof;
O is oxygen;
S is sulfur;
a is selected from zero and a number up to a positive real number representing the stoichiometric requirement, and
b is selected from zero and a number up to a positive real number representing the stoichiometric requirement, provided one of a and b is a positive real number;

$M_{II}$ is selected from the group consisting of titanium, zirconium, hafnium, and mixtures thereof;

c is a positive real number up to the stoichiometric requirement;

$M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_cM_{III}O_d$.

2. A mixed-solid solution tri-metallic oxide/sulfide catalyst according to claim 1 wherein $M_I$ is molybdenum.

3. A mixed-solid solution tri-metallic oxide/sulfide catalyst according to claim 1 wherein $M_{II}$ is zirconium.

4. A mixed-solid solution tri-metallic oxide/sulfide catalyst according to claim 1 wherein $M_{III}$ is selected from the group consisting of magnesium, calcium, and yttrium.

5. A mixed-solid solution tri-metallic oxide/sulfide catalyst according to claim 1 wherein $M_I$ is molybdenum, $M_{II}$ is zirconium and $M_{III}$ is selected from the group consisting of magnesium, calcium, and yttrium.

6. A mixed-solid solution tri-metallic oxide/sulfide catalyst according to claim 1 wherein said solid solution is comprised of about 8 to about 56 weight percent $M_{III}O_d$.

7. A mixed-solid solution tri-metallic oxide/sulfide catalyst according to claim 1 wherein said solid solution is comprised of about 10 to about 16 weight percent $M_{III}O_d$.

8. A mixed-solid solution tri-metallic oxide/sulfide catalyst according to claim 1 wherein $M_IO_aS_b$ comprises about 30 to about 75 weight percent of said catalyst.

9. A mixed-solid solution tri-metallic oxide/sulfide catalyst according to claim 1 wherein $M_IO_aS_b$ comprises about 45 to about 55 weight percent of said catalyst.

10. A mixed-solid solution tri-metallic oxide/sulfide catalyst according to claim 1 wherein $M_I$ is molybdenum, $M_{II}$ is zirconium and $M_{III}$ is selected from the group consisting of magnesium, calcium, and yttrium; said solid solution is comprised of about 8 to about 56 weight percent $M_{III}O_d$ and $M_IO_aS_b$ comprises about 30 to about 75 weight percent of said catalyst.

11. A mixed-solid solution tri-metallic oxide/sulfide catalyst according to claim 1 wherein $M_I$ is molybdenum, $M_{II}$ is zirconium and $M_{III}$ is selected from the group consisting of magnesium, calcium, and yttrium; said solid solution is comprised of about 10 to about 16 weight percent $M_{III}O_d$ and $M_IO_aS_b$ comprises about 45 to about 55 weight percent of said catalyst.

12. A process for preparation of a mixed-solid solution tri-metallic oxide/sulfide catalyst having the formula:

$$M_IO_aS_b \cdot M_{II}O_cM_{III}O_d$$

wherein $M_I$ is selected from the group consisting of vanadium, neodymium, tantalum, chromium, molybdenum, tungsten, and mixtures thereof;

O is oxygen;

S is sulfur;

a is selected from zero and a number up to a positive real number representing the stoichiometric requirement, and b is selected from zero and a number up to a positive real number representing the stoichiometric requirement, provided one of a and b is a positive real number;

$M_{II}$ is selected from the group consisting of titanium, zirconium, hafnium, and mixtures thereof;

c is a positive real number up to the stoichiometric requirement;

$M_{III}$ is selected from the group consisting of lithium, sodium, potassium, rubidium, cesium, francium, beryllium, magnesium, calcium, strontium, barium, radium, zinc, cadmium, mercury, scandium, yttrium, lanthanum, actinium, and mixtures thereof; and d is a positive real number up to the stoichiometric requirement; and wherein $M_IO_aS_b$ is mixed in a solid solution of $M_{II}O_c\text{-}M_{III}O_d$, said process comprising:

preparing a combination of $M_{II}O_c$ and $M_{III}O_d$ by a step selected from (a) preparing a liquid solution of $M_{II}O_c$ and $M_{III}O_d$; (b) preparing a liquid solution of one of $M_{II}O_c$ and $M_{III}O_d$ and a colloidal suspension of the other of $M_{II}O_c$ and $M_{III}O_d$ and forming a mixture of said colloidal suspension and liquid solution; and (c) preparing a liquid solution of $M_{II}O_c$ and impregnating said liquid solution of $M_{II}O_c$ on a solid powder of $M_{III}O_d$.

drying and calcining said combination of $M_{II}O_c$ and $M_{III}O_d$ to form a solid solution powder comprising $M_{II}O_cM_{III}O_d$;

adding and mixing $M_IO_aS_b$ to said solid solution powder to form said mixed-solid solution trimetallic oxide/sulfide catalyst.

13. A process according to claim 12 wherein said colloidal suspension is an aqueous suspension.

14. A process according to claim 12 wherein $M_{III}$ is in the form of a salt selected from the group consisting of nitrate, chloride, and mixtures thereof in preparing said liquid solution of $M_{III}O_d$.

15. A process according to claim 14 wherein said liquid solution is an aqueous solution of $M_{III}O_d$.

16. A process according to claim 12 wherein said colloid suspension and said liquid solution are aqueous.

* * * * *